W. W. WHITNEY.
VEHICLE WHEEL.
APPLICATION FILED MAR. 30, 1917.
1,282,155.
Patented Oct. 22, 1918.
2 SHEETS—SHEET 1.
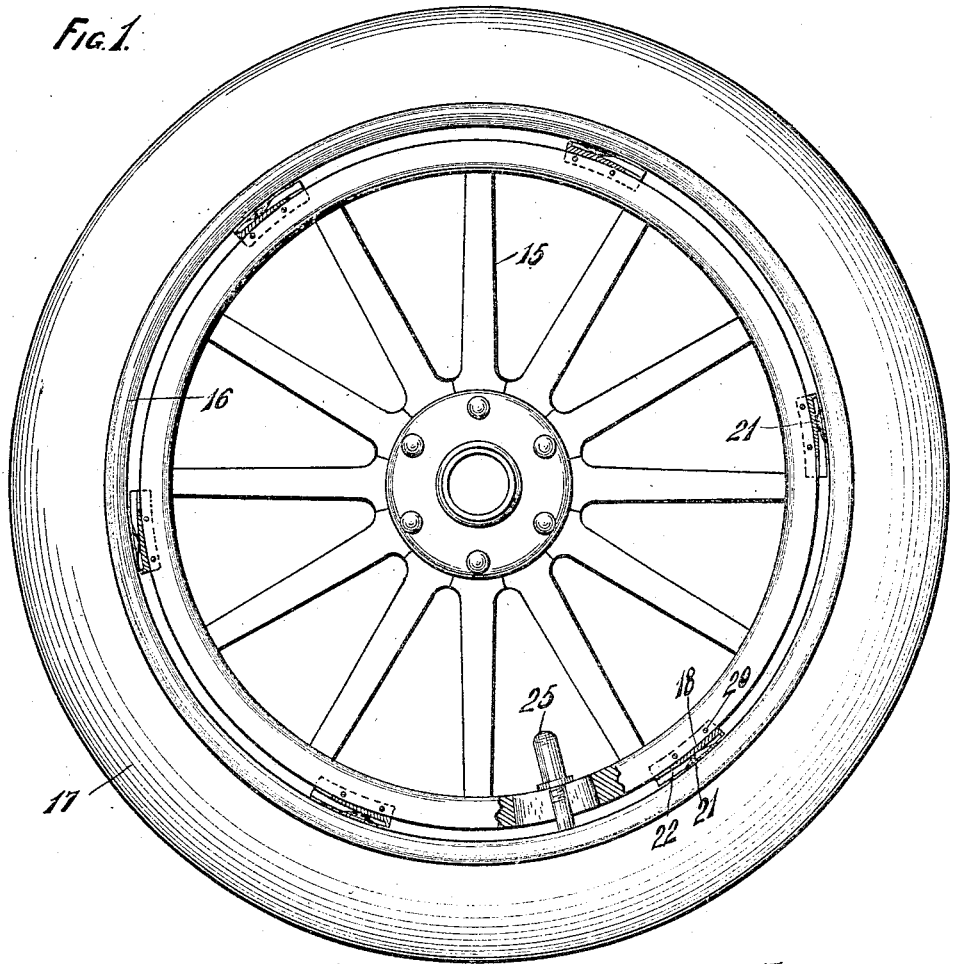
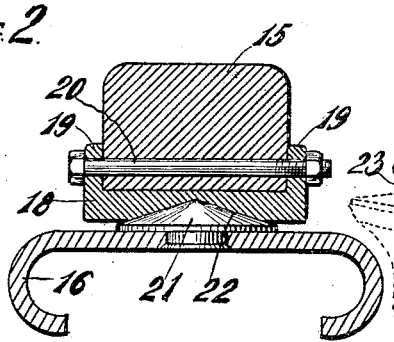
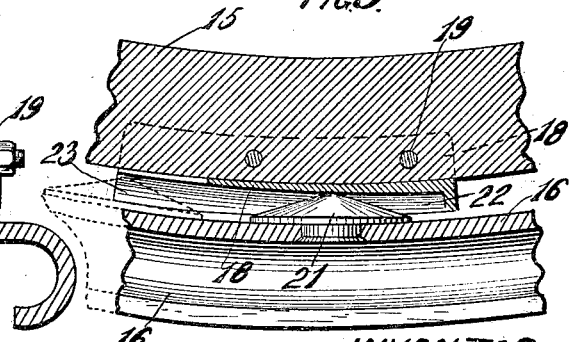
WITNESSES
INVENTOR

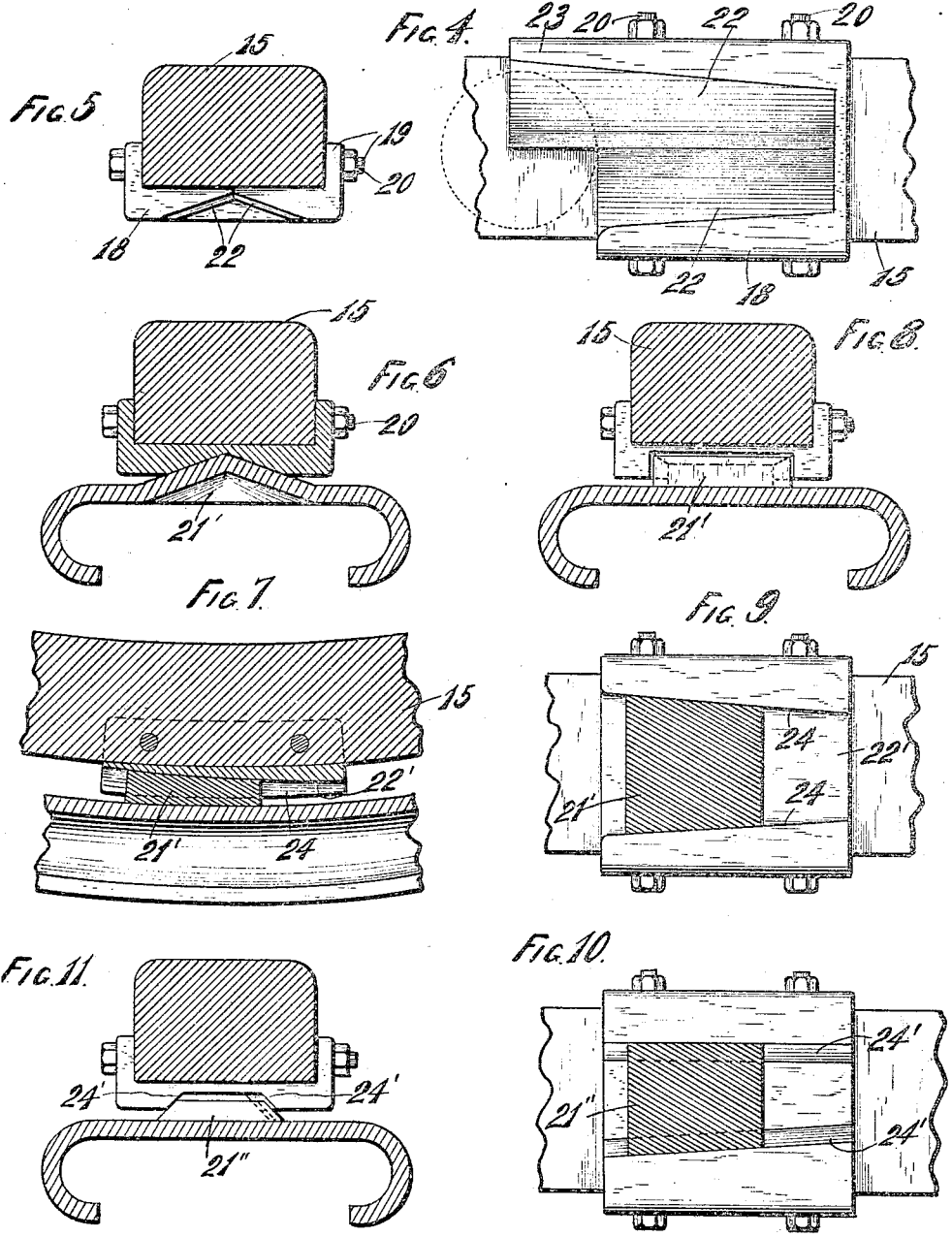

UNITED STATES PATENT OFFICE.

WHELOCK W. WHITNEY, OF MILWAUKEE, WISCONSIN.

VEHICLE-WHEEL.

1,282,155.          Specification of Letters Patent.       Patented Oct. 22, 1918.

Application filed March 30, 1917. Serial No. 158,605.

*To all whom it may concern:*

Be it known that I, WHELOCK W. WHITNEY, a citizen of the United States, and a resident of Milwaukee, in the county of Milwaukee and State of Wisconsin, have invented new and useful Improvements in Vehicle-Wheels, of which the following is a description, reference being had to the accompanying drawings, which are a part of this specification.

This invention has for its object to provide a demountable rim for vehicle wheels which may be more quickly removed and replaced than rim constructions now in general use requiring the turning of a number of bolts for the purpose.

An object of the invention is to utilize a movement of the rim around the wheel for tightening it in place instead of a movement laterally of the wheel, suitable cams being provided to tighten the rim as the result of such movement around the wheel.

With the above and other objects in view, the invention consists of the demountable rim as herein claimed and all equivalents.

Referring to the accompanying drawings in which like characters of reference indicate like parts in the several views:

Figure 1 is a face view of a vehicle wheel equipped with a demountable rim constructed in accordance with this invention;

Fig. 2 is a transverse sectional view through one of the cam plates thereof;

Fig. 3 is a longitudinal sectional view;

Fig. 4 is a plan view of a modified form of cam plate;

Fig. 5 is an end view thereof;

Fig. 6 is a transverse sectional view thereof with the rim engaged therewith;

Fig. 7 is a longitudinal sectional view of another modification of the invention;

Fig. 8 is an end view thereof;

Fig. 9 is a plan view thereof with the lug sectioned;

Fig. 10 is a similar view of a further modification, and,

Fig. 11 is an end view thereof.

In these drawings 15 indicates a vehicle wheel such as are commonly used on automobiles, and 16 represents the metal rim which is removably fitted to the felly of the wheel by the means constituting this invention and which carries the pneumatic tire 17 as usual.

Instead of wedges forced between the rim and felly by means of bolts requiring separate tightening, there are a number of cam plates 18 secured to the periphery of the felly at regular distances apart. The cam plates may be attached in any secure manner, but as shown have parallel side flanges 19 embracing the sides of the felly between them with bolts 20 passing through the flanges and the felly.

The cam plates are uniformly provided with inclined or cam surfaces to be engaged by lugs 21 projecting from the rim 16, so that a slight turning of the rim around the wheel, or of the wheel within the rim, causes all of the cam surfaces to operate alike to either tighten the rim on the wheel or to free it therefrom, according to the direction of turning.

The cam surfaces of the plates 18 are preferably contained within grooves, the edges of which by their engagement with the lugs 21 prevent lateral displacement of the rim and assist in firmly holding the rim in place on the wheel.

The relative position of the cam surface in the groove will depend upon the shape of the lug with which it is to coöperate. With a conical lug, either forming the head of a rivet, as in Fig. 2, or depressed in the sheet metal rim as in Fig. 6, or otherwise formed, the cam surface preferably constitutes the bottom walls of a V-shaped inclined groove 22 which will fit the lug in any of its positions.

For convenience in placing the rim on the wheel, one side of the cam plate is extended at 23 to form a stop against which the lug is pressed before entering it in the groove, such projection then serving as a guide to lead the lug to the groove when the rim is turned.

In use, the rim is merely turned on the wheel by hand, or preferably by means of a mechanical contrivance such as a lever or a rack and gear or a cam operating means, though none of these is shown, and the several lugs sliding along the inclined cam surfaces of the cam plates either tighten the rim on the wheel or release it therefrom. These relative rotary movements of the wheel proper and the rim are permitted by the tire valve 25 traveling in a slot in the felly of the wheel. Any means may be provided for locking the rim and wheel together after it has been adjusted to the desired tight fit to prevent the rim from working loose. The cam plates are so arranged that the natural tendency of the rims to turn on the wheels will be utilized to increase the clamping action of the cam surfaces rather than to cause the cams to release the rim.

The various modifications shown are based upon the same principle of the locking cams on the wheel felly coöperating with lugs on the rim in such a way as to tend to stretch the rim to a larger diameter while at the same time confining the lugs between side walls of the cam grooves to prevent lateral displacement of the rim. The construction shown in Figs. 7, 8 and 9 has a lug 21' shaped to have an extended bearing against the cam surface 22' between the converging side walls 24 and is therefore better adapted for use with heavy loads.

The construction illustrated in Figs. 10 and 11 has lugs 21" with beveled side edges forming the bearing faces engaging the converging beveled side walls 24' of the cam plate. These side edges 24' in this instance constitute the equivalent for the cam surfaces as they tend to crowd the lugs 21" out of the groove in order to distend the rim and form the clamping engagement therewith.

What I claim as new and desire to secure by Letters Patent is:

1. A vehicle wheel, comprising a wheel proper, cam plates secured to the periphery thereof and provided with cam grooves V-shaped in cross section, each cam plate having one side of one end thereof cut away leaving the other side forming a projecting guide, a rim surrounding the wheel proper, and conical lugs thereon adapted to be entered into the cam grooves through the cut away portions of the cam plates and in bearing with the said guides.

2. A vehicle wheel, comprising a wheel proper, cam plates having parallel flanges embracing the opposite sides of the wheel felly, bolts passing through the flanges and the wheel felly, said cam plates being provided with cam grooves V-shaped in cross section, a metal rim surrounding the wheel felly, and conical lugs on the metal rim fitting within the V-shaped cam grooves of the cam plates.

3. A vehicle wheel, comprising a wheel proper, cam plates secured to the periphery thereof and provided with cam grooves V-shaped in cross section, a metal rim surrounding the wheel proper, and rivets passing through the metal rim with conical heads fitting in the V-shaped cam grooves.

In testimony whereof I affix my signature in presence of two witnesses.

WHELOCK W. WHITNEY.

Witnesses:
R. S. C. CALDWELL,
H. D. CHASE.

Copies of this patent may be obtained for five cents each, by addressing the "Commissioner of Patents, Washington, D. C."